United States Patent [19]

Wendt

[11] 4,446,524
[45] May 1, 1984

[54] APPARATUS FOR LOADING AND UNLOADING AN AIRCRAFT

[75] Inventor: Hans-Joachim Wendt, Buxtehude, Fed. Rep. of Germany

[73] Assignee: Messerschmitt-Boelkow-Blohm Gesellschaft mit beschraenkter Haftung, Munich, Fed. Rep. of Germany

[21] Appl. No.: 317,143

[22] Filed: Nov. 2, 1981

[63] Continuation-in-part of Ser. No. 161,035, filed June 19, 1980, abandoned, which was a continuation-in-part of Ser. No. 002,062, filed Jan. 9, 1979, U.S. Pat. No. 4,225,926.

[30] Foreign Application Priority Data

Jan. 18, 1978 [DE] Fed. Rep. of Germany ..... 2802003
Jul. 3, 1978 [DE] Fed. Rep. of Germany ..... 2926870

[51] Int. Cl.$^3$ .............................................. G01M 1/12
[52] U.S. Cl. ..................................... 364/463; 364/567
[58] Field of Search ............... 364/463, 567, 426, 441, 364/439; 177/25, 26, 136; 73/65

[56] References Cited

U.S. PATENT DOCUMENTS

| | | | |
|---|---|---|---|
| 3,746,844 | 7/1973 | Azum et al. ........................ | 364/463 |
| 4,196,474 | 4/1980 | Buchanan et al. ............... | 364/441 X |
| 4,197,536 | 4/1980 | Levine ............................. | 364/439 X |
| 4,225,926 | 9/1980 | Wendt ................................ | 364/463 |

*Primary Examiner*—Edward J. Wise
*Attorney, Agent, or Firm*—W. G. Fasse; D. H. Kane, Jr.

[57] ABSTRACT

The present apparatus is used for ascertaining the individual weight of any type of load including that of passengers and of hand baggage, that is added to the total payload of an aircraft. Each individual weight is ascertained and, if desired, displayed and added up to ascertain the total weight. For this purpose a weight sensing device such as a group of load cells or the like including a platform is arranged at the entrance to the freight or baggage compartment and, in a passenger aircraft at each passenger entrance door inside the aircraft. The weight sensing device provides an electrical signal for each weight unit that passes the platform into the aircraft. The weight representing electrical signal is supplied to an adder and to a display unit where the individual weights are displayed as well as the total weight. Further, control signals may be derived from the individual weight representing signals and control signals may be provided through a keyboard for energizing drive rollers or conveyors which transport a freight container or the like to a predetermined freight stall and for lashing the container down in its stall. This system cooperates with a data processing system located on the ground. The airborne system communicates with the data processing system on the ground through a data transmission link.

9 Claims, 10 Drawing Figures

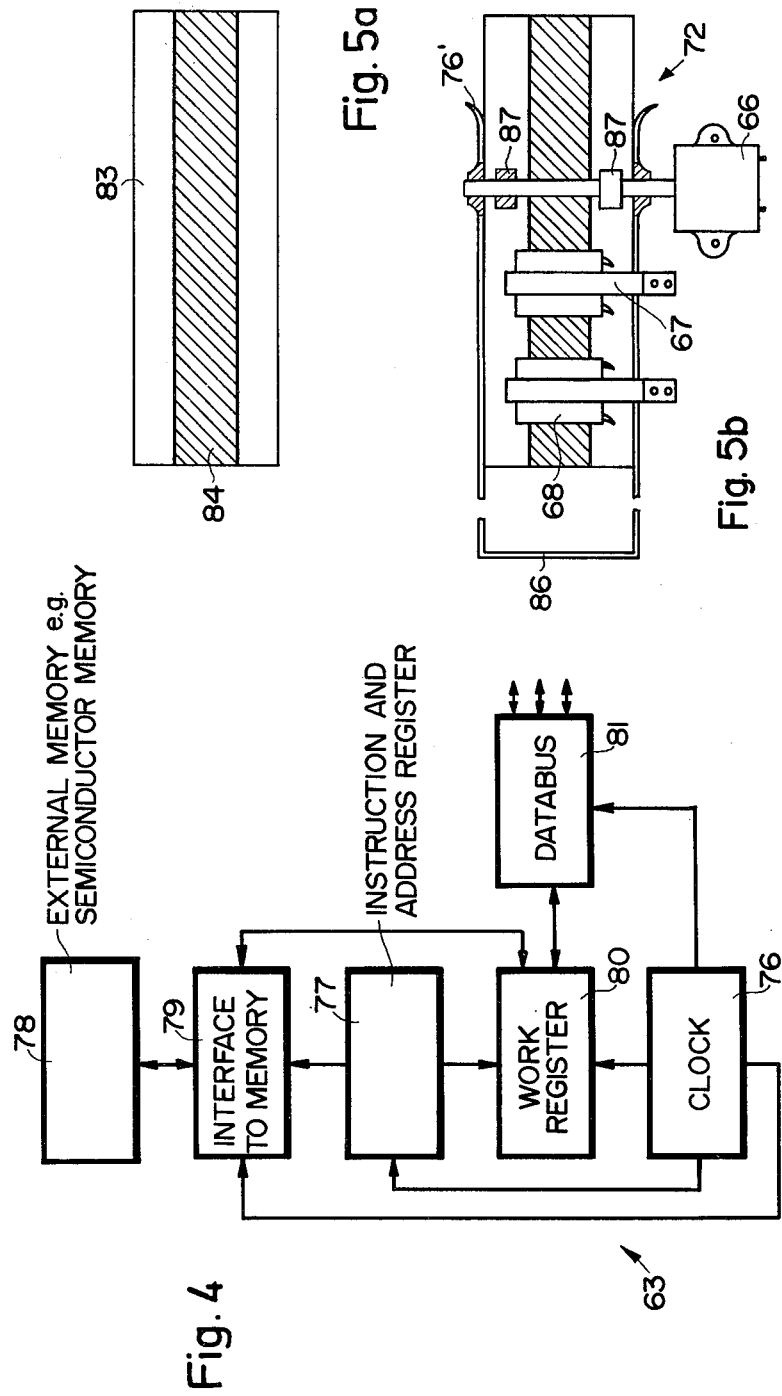

APPARATUS FOR LOADING AND UNLOADING AN AIRCRAFT

CROSS-REFERENCE TO RELATED APPLICATION

The present application is a Continuation-In-Part application of my copending application U.S. Ser. No.: 161,035; filed on June 19, 1980, now abandoned, which was a Continuation-In-Part application of Ser. No.: 002,062; filed in the United States on Jan. 9, 1979, now U.S. Pat. No. 4,225,926, issued on Sept. 30, 1980.

BACKGROUND OF THE INVENTION

The invention relates to an apparatus for loading and unloading an aircraft, whereby known loading and unloading equipment is used for transporting the load items and for lashing down such load items on the loading floor of the aircraft. More specifically, the present invention relates to an improvement of my previous invention disclosed in the above mentioned U.S. Pat. No. 4,225,926 describing an apparatus which makes it possible to exactly determine the total weight of the aircraft as well as any intermediate load addition items that may have been added when an aircraft touches down at several airports to take on or discharge freight items, passengers, and baggage.

It is also known to employ a digital computer combined with weighing equipment provided with weight sensors delivering an electrical output signal. Such computers are mainly used for calculating the optimal center of gravity of the aircraft for the purpose of reducing the trim resistance. U.S. Pat. No. 3,746,844 is representative of this prior art.

However, it is still necessary to rely on a loading and trim schedule which is prepared on the ground as a preliminary to any loading and trimming operations. Data are then supplied to the computer in accordance with such schedule for ascertaining the optimal loading arrangement and for also taking into account the individual load data which are not subjected to any load additions such as the empty weight of the aircraft, the weight of the fuel, and so forth. This operation requires additional personnel for filling out these schedules for each new loading. Such operation also requires the manual input of the data into the airborne computer and control unit.

OBJECTS OF THE INVENTION

In view of the above it is the aim of the invention to achieve the following objects singly or in combination:

to avoid the above mentioned manual data inputting and to provide for an automatic data preparation on the ground, whereby it becomes possible to input the so prepared data through a data carrier automatically without any manual keyboard operation into the airborne computer and control unit;

to substantially avoid any errors that may happen when the loading and trimming schedules are filled out manually;

to provide a radio transmission link between the airborne and ground based system components, whereby the link is preferably usable in both directions; and to calculate optimal loading plans for an aircraft for the purpose of minimizing the fuel consumption, whereby the input data required for this purpose may be read selectively from ground and/or airborne weighing devices.

SUMMARY OF THE INVENTION

According to the invention there is provided an apparatus of the type described which is characterized in that the airborne system of my U.S. Pat. No. 4,225,926 cooperates with ground based electronic data preparing and transmitting means. It is a special advantage of the invention that data carriers in the form of magnetic cards may be used. Further, substantial personnel expenditures may be saved where the present system is utilized while simultaneously achieving an acceleration of the loading and unloading operation of the aircraft. Transmission errors between the ground based and airborne components of the system are largely eliminated because erroneous filling-out of the loading and trimming schedules is avoided according to the invention. Due to the use of a radio link between the ground based components and the airborne components of the apparatus, particularly between the ground based and airborne digital computer means, it is possible to submit data regarding the intended loading of the aircraft directly to the aircraft during its flight which results in a further time saving on the ground. The data which the computer or microprocessor uses for its operation include, for example, the weight of the passengers, baggage and freight items, fuel, on-board service items, and other flight information data.

BRIEF FIGURE DESCRIPTION

In order that the invention may be clearly understood, it will now be described, by way of example, with reference to the accompanying drawings, wherein:

FIG. 4 illustrates a block circuit arrangement of the computer unit shown in FIG. 1;

FIGS. 5a and 5b illustrate a magnetic card and a data recording and data reading device for the magnetic card;

Figure 8:
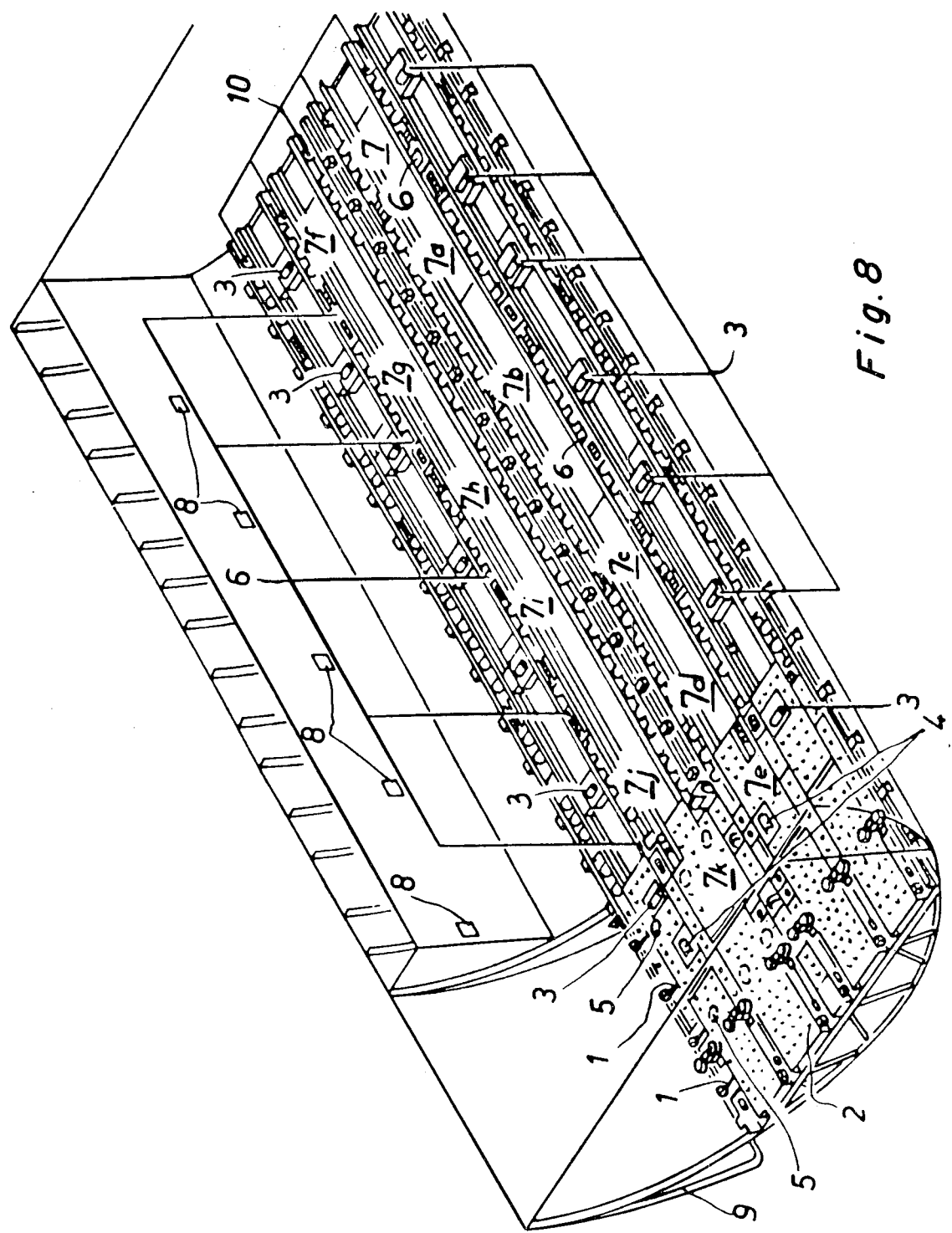
Figure 9:
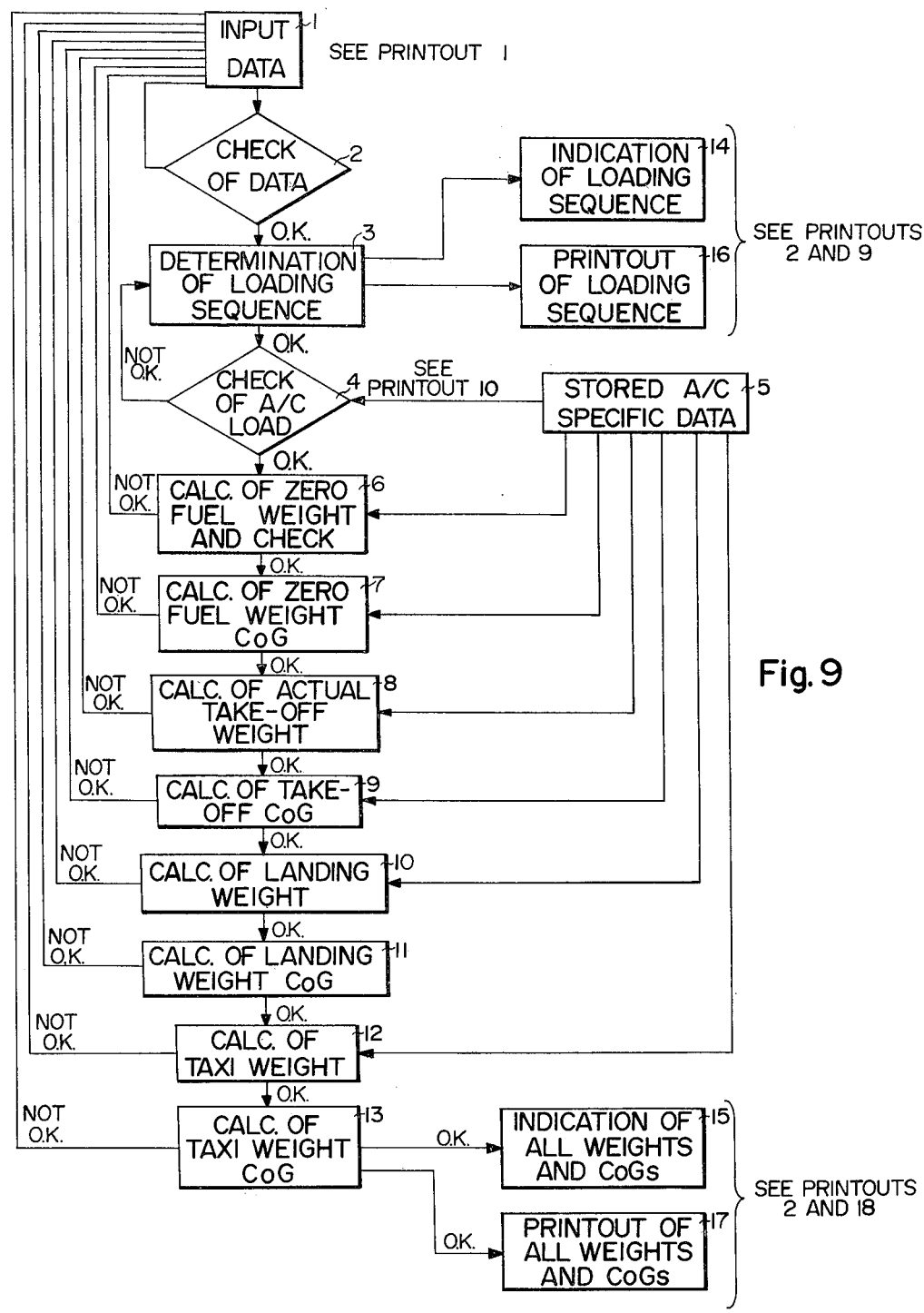

FIG. 8 is a perspective, somewhat schematic view of a freight space area inside an aircraft including means for loading and unloading the freight space in accordance with the disclosure of my above mentioned U.S. Pat. No. 4,225,926; and FIG. 9 is a flow diagram of the sequence of steps performed in calculating the optimal freight and passenger weight distribution.

DETAILED DESCRIPTION OF PREFERRED EXAMPLE EMBODIMENTS AND OF THE BEST MODE OF THE INVENTION

Figure 1:
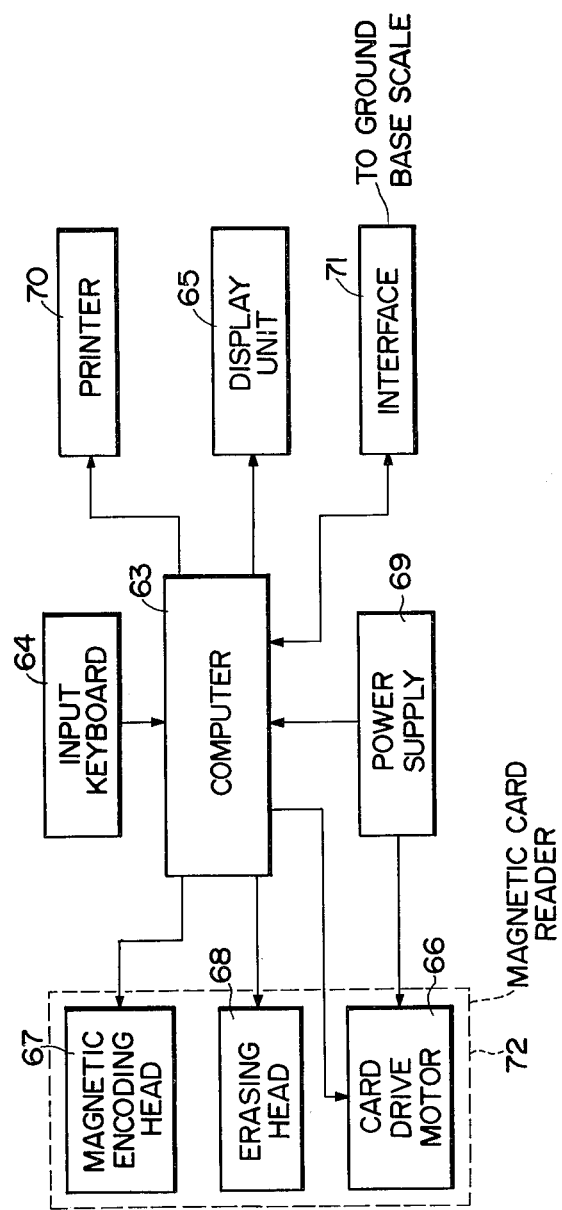
FIG. 1 is a block circuit diagram of the ground based electronic loading and trim data unit.

FIG. 1 shows an overall block circuit diagram of the ground based arrangement of the electronic loading and trimming data unit. This unit comprises essentially a computer 63, such as a digital computer, for example, a so-called micro-processor Model HP 85 (Hewlet-Packard) would be suitable, including a semi-conductor memory as well as an input keyboard 64 and a display unit 65. The computer 63 itself controls a card drive motor 66, for example, for a magnetically encodable data carrier card handled in a magnetic card reader 72. Additionally, the computer or micro-processor 63 is operatively connected with its respective control outputs to a magnetic encoding head 67 and to a magnetic erasing head 68. The magnetic encoding head 67 records the data prepared by the computer 63 on the magnetically encodable data carrier card 83 shown in FIG. 5a. The erasing head 68 also connected to the computer 63 serves for erasing of old or erroneous data or sets of data on the data carrier card 83. The card drive motor 66 and the magnetic heads 67, 68 form the magnetic card reader 72 shown also in FIG. 5b.

Referring further to FIG. 1, a power supply 69 is connected to the computer 63 and to any peripheral equipment for supplying the computer 63 and such peripheral equipment with the required energy. A printer 70 is connected to the computer 63 to provide, in parallel to the display 65, a written clear text record of the data ascertained by the computer 63. An electronic interface 71 connected between the computer 63 and a ground based scale permits the gathering of the individual weights of freight items to be loaded which are ascertained by such an electronic ground based scale and to supply these scale data to the computer 63. Thus, the computer is now able to transmit to the data carrier, such as a magnetic card 83, the data which are either entered directly through a keyboard 64 or which are automatically submitted to the computer by the ground based scale to provide loading information data. Such data represent the weight of the individual loading items including the weight of passengers, baggage, freight items including bulk freight, fuel, aboard service items and so forth. As mentioned, the data carrier may, for example, be a plastic card 83 provided with a magnetic coating 84 as shown in FIG. 5a. The individual data may now be entered on the card in a bit serial manner and in a line format.

Figure 2:
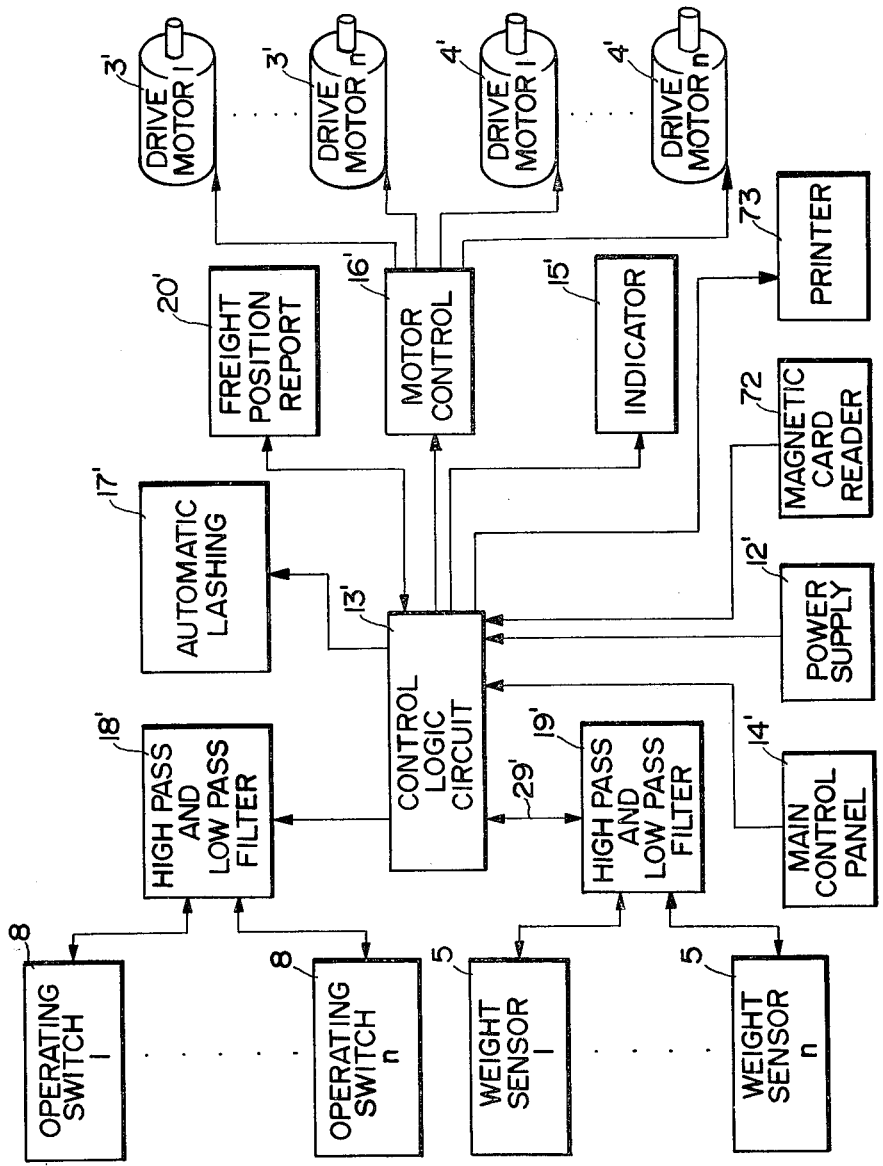
FIG. 2 illustrates in block form the airborne control or on-board control circuit arrangement for the loading and unloading of an aircraft in response to the reading of a magnetic card by a magnetic card reader.
Figure 3:
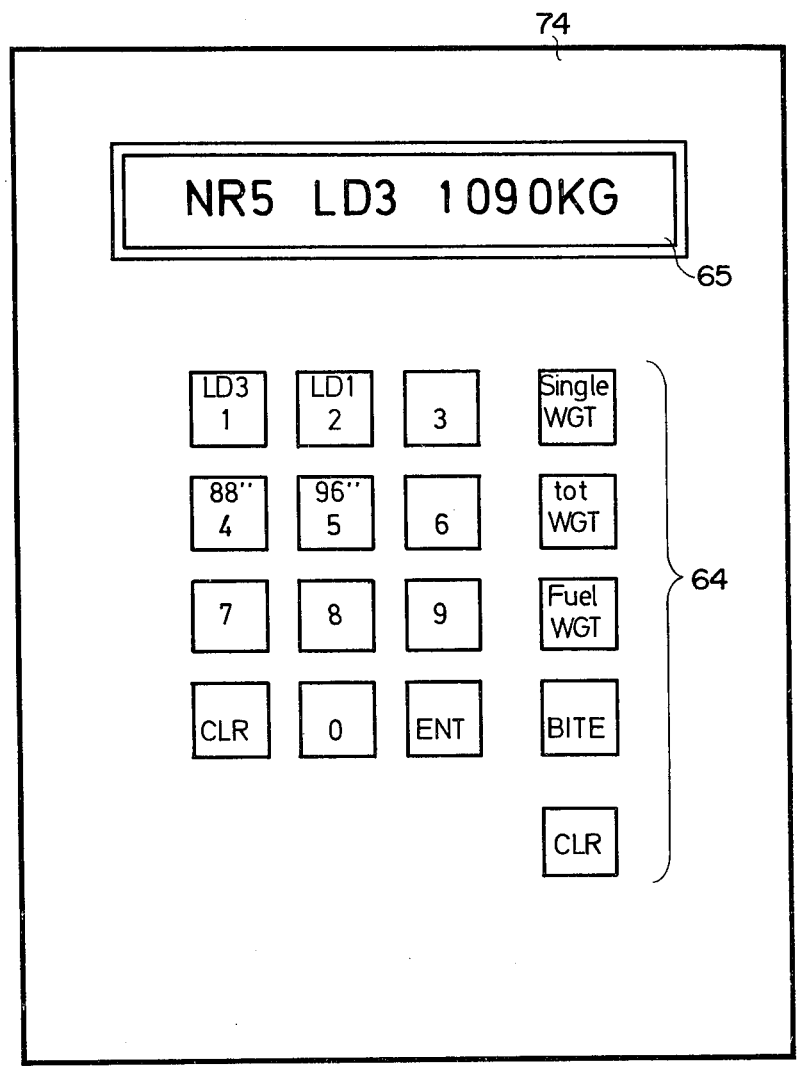
FIG. 3 illustrates a keyboard and display unit for the electronic loading and trim data units as shown in FIG. 1.

FIG. 2 shows primarily an airborne control for an airborne arrangement for the loading and unloading of an aircraft, said control comprising a control logic circuit 13', a main control panel or input keyboard 14' with a display unit 65 shown in FIG. 3, several weight sensors 5, a motor control 16' for drive motors 3', 4', and an automatic lashing device 17'. This control is shown in principle in FIG. 2 of my above mentioned U.S. Pat. No. 4,225,926 and is supplemented by a magnetic card reading device 72 and a printer 73. The magnetic card reader 72 reads the information stored on the magnetic card 83 shown in FIG. 5a in a bit format and supplies this information into the airborne computer and control unit 63.

The computer and control unit 13' ascertains from the above mentioned data the final loading sequence and loading arrangement resulting in an optimal center of gravity for minimizing the fuel consumption. However, it is also possible that the ground based loading and trim data unit according to FIG. 1 provides a preliminary suggestion for an optimal loading sequence and loading arrangement based on the knowledge of the individual loading or weight data listed above. This suggestion may also be present on the magnetic card 83 as an additional information in a bit format or it may be printed out in a parallel manner on the connected printer 70 shown in FIG. 1 of the ground based loading and trim data unit. This preliminary loading sequence and loading arrangement may then be checked by the airborne computer and control unit 13' and changed if necessary if the limiting conditions of the loading should vary, for example, due to the occurrence of wind loads or when so-called short notice freight must additionally be taken into account. In an alternative to the just described embodiment, the ground based loading and trimming unit shown in FIG. 1 may calculate the trimming resistance resulting from the loading suggestion and the higher or lower fuel consumption resulting therefrom. Such calculation by the ground based loading and trim unit takes into account the stored functions of the specific aircraft in response to the center of gravity position and in response to the trimming.

FIG. 3 shows a control panel 74 whereby the main input device in the form of a keyboard 64 is integrated in a housing with the display unit 65. The keyboard 64 is also shown in FIG. 1. All required individual weight data, for example, container or pallet weights are inputted into the computer unit 63 according to FIG. 4 in digital form. The keyboard 64 comprises a respective encoder of known construction which converts the input data in accordance with a standardized code, for example ASCI. Thus, these data are first processed for the further processing by the connected digital devices.

FIG. 4 shows a possible circuit arrangement of the computer 63 which is part of the ground based control logic shown in FIG. 1. The computer 63 comprises a clock generator 76, and instruction and addressing registers 77, an external memory 78, an interface 79 connecting to the memory 78, a work register 80 and a databus 81. The clock generator 76 provides a time base for all sequences. The instruction and addressing register 77 comprises all internal computer instruction words and corresponds with the respective addressing units as shown in the figure. The computer communicates through the interface 79 with the external memory 78 which functions as a direct access memory, for example in the form of a semi-conductor memory. The central work register 80 serves for performing of the mathematical and logical work sequences. The data are supplied through the databus 81 to the work register 80. The databus 81 functions as a digital interface for the code conversion into the respective computer word structure. The databus 81 provides the data with the storage instruction and with the specific memory address whereupon the data are passed on to the interface 79 leading to the external semi-conductor memory 78. If these data are to be displayed on the display unit 65 of the computer 63 the set of data is read-out from the memory 78 by means of a read instruction and supplied through the databus 81 to the display unit 65. If the data are applied in printed form to a paper strip or in a coded form on a magnetic card, this is accomplished also through the databus 81 which is connected to the respective devices such as the printer 70 and the magnetic card reading device 72.

FIG. 5b shows the essential elements of the magnetic card reading device 72, namely, a guide input 76', a combined reading/writing head 67, an erasing head 68, a motor 66, and two feed advance rollers 87. If a magnetic card 83 is introduced into the guide input 76' to a predetermined extent, the motor 66 is started, whereby the motor 66 drives the card 83 by means of the two rollers 87 in the leftward direction to a stop 86 in the reading device 72. The stop 86 actuates a switch not shown but so arranged that the direction of rotation of the motor 66 is reversed, whereby the magnetic card 83 is discharged again. During the movement of the magnetic card 83 the respective data are entered or read-out through the write/read read 67. Erroneous or old data may be erased by means of the erasing head 68.

Figure 6:
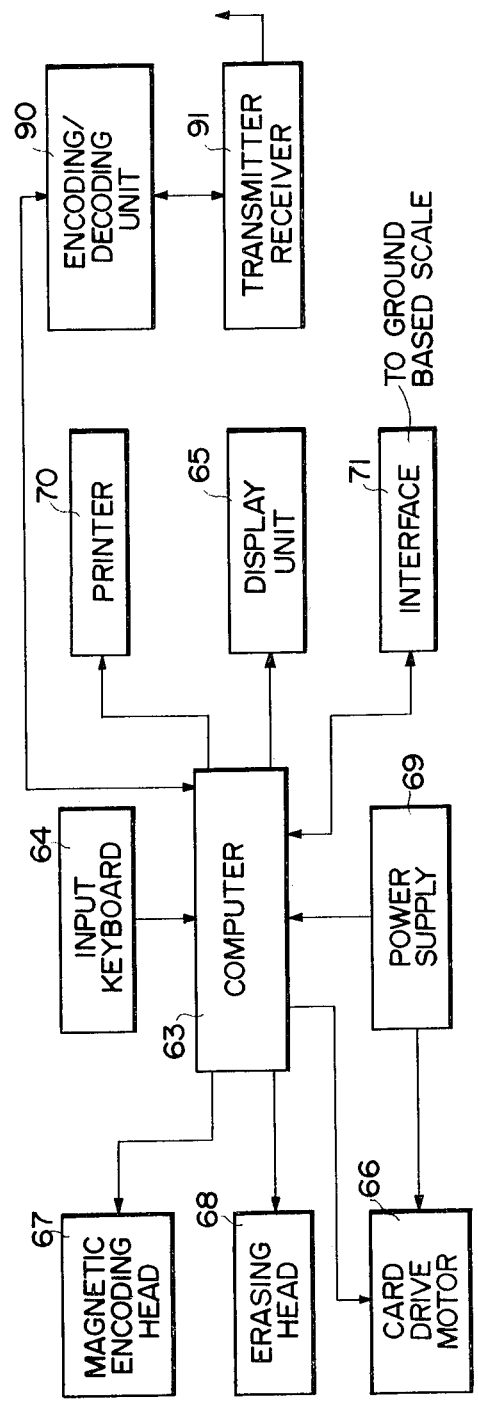
FIG. 6 illustrates a block circuit diagram of an electronic loading and trim data unit including radio link components such as a transmitter/receiver.

Referring to FIG. 6 there is shown the ground based electronic loading and trim data unit according to FIG. 1 with the already mentioned and described functional units 63 to 71 supplemented by an encoding and decoding unit 90 and a transmitter receiver 91. The computer 63 enters the loading data provided with the special aircraft address in digital form into the encoder 90 which transforms the entered data into a standardized telegram format for the data transmission and modulates this onto the carrier wave of the data transmitter 91 in a suitable form. For this purpose all known data modulation methods may be used, for example, frequency modulation, amplitude modulation, phase modulation, pulse code modulation, and so forth.

In the reverse, the signals received by the transmitter receiver 91 of the airborne arrangement are entered through the encoding, decoding unit 90 into the computer 63, whereby the telegram format of the incoming signal is again converted in its code into the internal computer word format by the unit 90.

Figure 7:
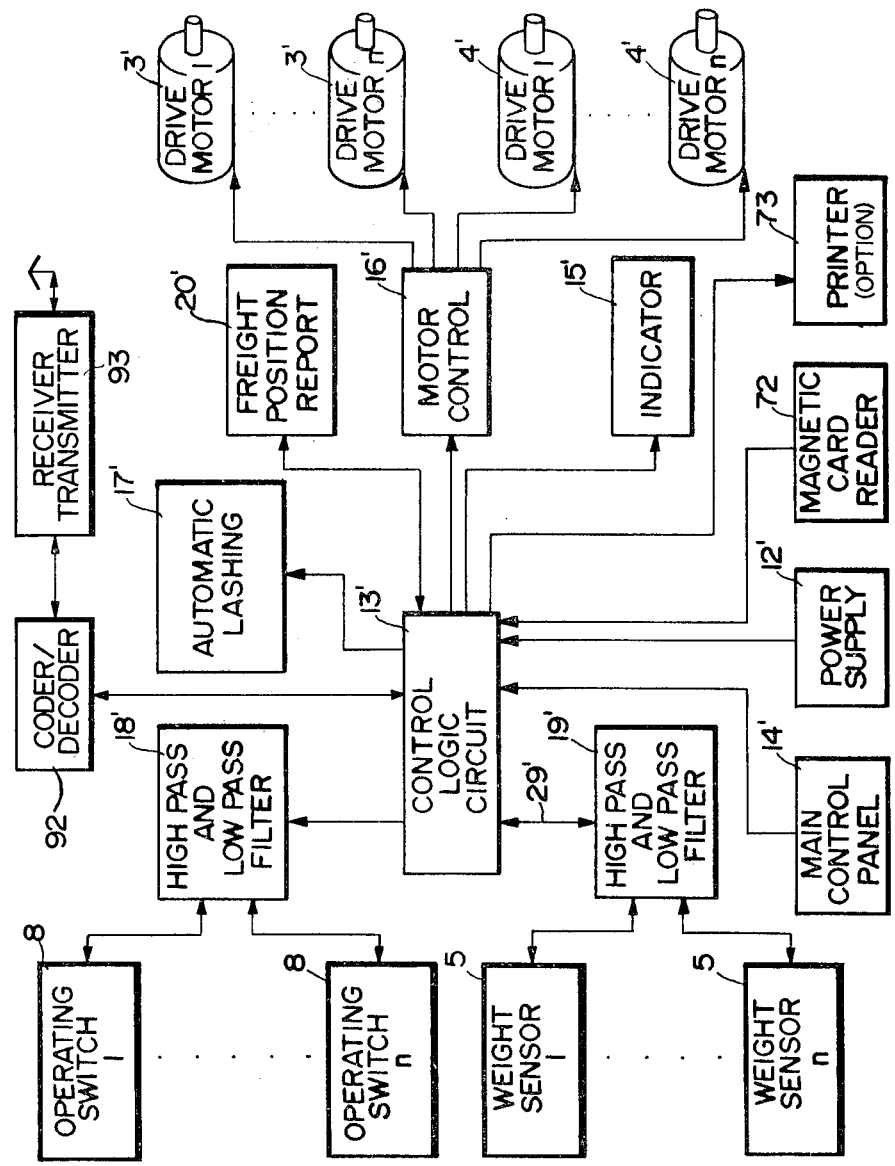
FIG. 7 is a block circuit diagram for the airborne or on-board loading and unloading control circuit including radio link components, such as an encoder/decoder and a transmitter/receiver.

As shown in FIGS. 6 and 7, a further embodiment of the invention resides in providing a radio link between the ground based components and the airborne components of the system so that the ground based loading and trim computer unit of FIG. 1 as modified in FIG. 6 may communicate with the airborne computer and control unit of FIG. 2 as modified in FIG. 7, whereby the data present on the magnetic record card 83 may be directly transmitted through the radio link to the airborne computer and control unit. This feature has the advantage that further time is saved because the respective operating steps otherwise to be done on the ground are eliminated. FIG. 7 shows the airborne control according to FIG. 2 respectively extended by a coding/decoding unit 92 and a transmitter receiver 93. These devices cooperate with the connected units as described above relative to the ground based arrangement.

Incidentally, the keyboard 64 may be realized in the form of Model Number RAFI 3.81103.001.

Additionally, this type of radio link or data transmission provides the possibility that already during the flight the actual loading data may be interrogated by the ground based components from the airborne components for facilitating the subsequent unloading and loading operations.

In case the aircraft makes intermediate stops in sequence for taking on and/or discharging passengers and/or freight items for different destinations, the invention provides the possibility that the airborne components or rather the airborne computer and control unit is also equipped to record data on magnetic cards with the respective information regarding the actual loading, whereby these data are provided for transmission to the ground based loading and trim computer units.

The system of FIG. 1, comprising an electronic loading unit operates as follows. First, a self-testing program may be performed by switching the system "ON" whereby the computer 63 checks the individual electrical and electronic components, indicating the results in the display 65. This auto-test program can also be initiated manually by means of the BITE key of the keyboard 64 shown in FIG. 3.

After the self-testing, the actual loading program is initiated in the computer by operating the ENT (enter) key, whereby in the display 65 the request for the number of the first item of cargo (NR?) appears. When this information has been entered and the ENT key is pressed, the request for a weight (WGT?) entry is displayed, and the appropriate entry made. Each entry is effected by operating the ENT key. Any entry can be deleted by operating the CLR (clear) key, and subsequently corrected, if necessary. All relevant individual weight data, for example for containers or pallets, are entered in digital form into the computer unit by means of the keyboard and display device 74 illustrated in FIG. 3. The keyboard 64 employs for this purpose a standardized digital code, for example, the ASCI-code. These data are supplied to the databus 81 of the computer which is shown in FIG. 4. The databus 81 serves as a digital interface to the code transformation into the respective computer word structure. The data are transmitted to the work register through the databus 81 of the computer. The work register provides the data with the storage instruction and with the specific memory address, whereupon they are transmitted to the interface 79 leading to the external semi-conductor memory 78. If the data are to be displayed on the display unit 65 of the microprocessor, the set of data is read out from the memory in response to a read instruction and the databus 81 supplies the data to the display unit. If the data output is to be provided in printed form, for example on a paper strip, or in coded form, for example on the magnetic card, this is also accomplished in the same manner through the databus 81 which is connected to the respective system components such as the printer 70 (FIG. 1), the encoder 67, or the erasing heat 68 and so forth. In other words, the databus 81 connects these system components to the work register 80 shown in FIG. 4.

When the cargo data entries are complete, the program to determine the CG-optimized load configuration is initiated. The display indicates the first item to be loaded and its position in the cargo compartment. Alternatively, the results of the program can be provided on a print-out. The following print outs (1) to (18) in combination with FIG. 9 provide further details showing how to operate the present system.

FIG. 8 illustrates a somewhat schematic, perspective general view of the freight space in an aircraft incorporating an example embodiment of a system according to the invention for the loading and unloading of such aircraft. A door 9 leads into the freight compartment. Guide rails 1 near the gate or door 9 lead a freight container, not shown, onto a platform supported by weight sensors 5 to be described in more detail below. The platform with the weight sensors 5 may be covered by so-called ball bearing mats 2. Longitudinal drive rollers 3 extending across the width of the freight compartment are provided for transporting a freight container in the direction of the longitudinal axis of the freight compartment. Further, drive rollers 4 extending with their longitudinal axis in the direction of the longitudinal axis of the freight compartment are provided for moving a freight container or the like across the width of the freight compartment.

The freight compartment is divided into freight positions or stalls indicated as 7, 7a to 7k. The just mentioned freight positions or stalls are located adjacent to longitudinal roller conveyors 10. Further longitudinal drive rollers 3 are located in the area of these freight positions. Each freight position is equipped with a freight lashing or latching mechanism 6 known as such and capable of securing, for example, a pallet or freight container to the loading floor of the freight compartment. Such lashing devices 6 may be installed recessed below the level of the freight floor or they may be installed on top of the freight floor as is well known in the art.

When loading, for example, a freight container into the freight compartment through the open door 9, the container is placed on the guide rails 1 and moved along such guide rails toward the ball bearing mat 2 until the rollers 4 contact the container and move it into the freight position 7k. When the container has taken up the position 7k the drive means are manually switched off by the operator and the weight of the container is ascertained by means of the weight sensors or load cells 5. Thereafter, again manually, the drive rollers 4 are switched on to move the container, for example into position 7e. Thereafter the longitudinal drive rollers 3 are switched on to move the container to position 7, whereby the roller conveyor means 10 reduce the friction between the moving container and the freight floor. If the container has taken up its intended position, for example position 7, all drive means are switched off and the respective latching mechanism 6 is activated to secure the freight container in position. The latching mechanism may, for example, comprise magnetically operated hooks which engage respective recesses of the freight container as is well known in the art. When container positions 7 to 7e are fully occupied, the following containers will, in the same manner as described in the foregoing, be moved into their respective positions 7f to 7k. The last container is placed, for example, in position 7, and is latched in position in the same manner as all the other containers. The unloading takes place in the same manner only in the reverse, whereby the weighing step is omitted.

The activation and deactivation of the various drive means 3, 4 is accomplished by operating switches 8 for closing and opening respective drive energizing circuits for the motors 3', 4' shown in FIG. 2. The switches 8 are also shown in FIG. 2. The arrangement may be such that the respective motors are energized as long as an operator depresses the corresponding switch 8. These switches may be constructed as will be described in more detail below with reference to FIG. 8. By driving the motors 3', 4' only as long as the corresponding switch 8 is depressed and by locating the switches 8 at such a level, that only a standing operator can depress a switch 8, a safety feature is provided in that a container cannot roll over an operator who may have fallen by accident to the freight floor.

In the light of FIG. 8, the circuit of FIG. 2 will now be described in more detail. The operating switches 8 are operatively connected through corresponding high pass and low pass filter means shown in a common block 18' to the control logic circuit 13' which is operated through the main control panel 14'. A motor control 16' is connected to the control logic circuit 13' for activating the drive motors 3',4', whereby the actuation of any of the switches 8 results in a control signal passed through the control logic circuit 13' and through the motor control 16' of conventional construction. A display unit or indicator 15' is also connected to the control logic circuits 13' for indicating the ascertained weights of the individual freight items or of the individual passengers as well as for indicating the total weight as ascertained by the weight sensors 5 which are also operatively connected through respective high pass filter and low pass filter means 19' to the control logic circuit 13'. A position or rather freight position report mechanism 20' is also connected to the logic circuit 13' for indicating which freight positions 7, 7a, 7b, 7c through 7k have been filled. An automatic lashing mechanism 17' receives its control signal from the logic circuit 13' in response to respective input instructions from the operator through the main control panel 14' or in response to a signal received from the position report mechanism 20'. A power supply unit 12' is connected to the logic circuit 13' and supplies all components of the system with the necessary power. For this purpose the main control panel 14', the weight sensors 5, the indicating unit 15', and the motor control unit 16' are operatively connected to the logic circuit 13' by means of coaxial cables which transmit the respective information or control signals by means of a modulated carrier frequency. The cables simultaneously supply the power necessary for operating the various active components of the system.

PRINT OUT NO. 1
Input Data for Computer 63 in FIG. 1

| FLIGHT NR | LH345 | | |
|---|---|---|---|
| A/C REG = (AIRCRAFT)REG LIMITATIONS: | 12345 | (1) | Specified Aircraft Data |
| FOR ZFW Zero Fuel Weight | 124000KG | | Aircraft |
| FOR TXW Taxi Weight | 165900KG | | Weight |
| | | (2) | Data |
| FOR TOW Take Off Weight | 165000KG | | Limits |
| FOR LW Landing Weight | 134000KG | | |
| TOTAL FUEL | 40000KG | | Aircraft |
| TRIP FUEL | 35000KG | (3) | Actual Fuel |
| TAXI FUEL | 500KG | | Data |
| ALLOWABLE TRAFFICLOAD | 40000KG | | Limited and |
| ACTUAL TRAFFICLOAD | 37319KG | (4) | Actual Payload |

FREIGHT LIST:
UPPER DECK

| NR | WEIGHT |
|---|---|
| 14 | 0KG |
| 12 | 1140KG |
| 13 | 2400KG |
| 2 | 2450KG |
| 1 | 2450KG |
| 5 | 2500KG |
| 3 | 2550KG |
| 11 | 2795KG |
| 10 | 2795KG |
| 9 | 2795KG |
| 8 | 2835KG |
| 6 | 2987KG |
| 7 | 3337KG |

(5) Weight Items to be loaded on Upperdeck of the Aircraft (e.g. Pallets, Containers, etc.)

LOWER DECK

PRINT OUT NO. 1
Input Data for Computer 63 in FIG. 1

| | | |
|---|---|---|
| 47 | 0KG | |
| 46 | 0KG | |
| 45 | 0KG | |
| 111 | 105KG | |
| 112 | 200KG | (6) Weight Items to be Loaded on the Lowerdeck of the Aircraft (e.g. Pallets, Containers, etc.) |
| 43 | 348KG | |
| 42 | 935KG | |
| 23 | 1077KG | |
| 44 | 1285KG | |
| 41 | 1285KG | |

BULKLOAD
COMPARTMENT A : 190KG   (7) Weight of Bulkload to be
COMPARTMENT B : 860KG        Loaded in the Bulkload
                              Compartment of the Aircraft

PRINT OUT NO. 2
Output Data From Computer 63 in FIG. 1

CALCULATED LOADING SEQUENCE:

| UPPER DECK | | LOWER DECK | | |
|---|---|---|---|---|
| POS. NR. | ITEM NR. | ITEM WGHT | POS. NR. | ITEM NR. | ITEM WGHT |

| POS. NR. | ITEM NR. | ITEM WGHT | POS. NR. | ITEM NR. | ITEM WGHT |
|---|---|---|---|---|---|
| 101 | 14 | 0KG | 11 | 47 | 0KG |
| 102 | 9 | 2795KG | 12 | 16 | 0KG |
| 103 | 11 | 2795KG | 21 | 43 | 0KG |
| | | | 22 | 111 | 105KG |
| 104 | 10 | 2795KG | | | |
| | | | 23 | 112 | 200KG |
| | | | 24 | 43 | 348KG |
| 105 | 8 | 2835KG | | | |
| 106 | 7 | 3337KG | | | |
| 107 | 6 | 2987KG | | | |
| 108 | 3 | 2550KG | | | |
| | | | 41 | 42 | 935KG |
| 109 | 5 | 2500KG | | | |
| | | | 42 | 23 | 1077KG |
| 110 | 2 | 2450KG | | | |
| | | | 43 | 44 | 1285KG |
| | | | 44 | 41 | 1285KG |
| 111 | 1 | 2450KG | | | |
| | | | BULK A: | | 190KG |
| 112 | 13 | 2400KG | | | |
| | | | BULK B: | | 860KG |
| 113 | 12 | 1140KG | | | |

(8) Actual loading configuration for all cargo compartments of the aircraft, which is optimized to minimum fuel consumption.

| | | |
|---|---|---|
| ACTUAL OWE | 84000KG | |
| CG OF OWE | 22.2% MAC | |
| ACTUAL ZFW | 121320KG | |
| CG OF ZFW | 32.0% MAC | (9) Calculated weight and center of gravity data for the actual flight |
| ACTUAL TXW | 161320KG | |
| CG OF TXW | 30.4% MAC | |
| ACTUAL TOW | 160820KG | |
| CG OF TOW | 30.5% MAC | |
| ACTUAL LW | 125820KG | |
| CG OF LW | 33.5% MAC | |

PRINT OUT NO. 3

```
10  ! O B C O 50
20  !
25  CLEAR @ DISP "O B C O 50 "
26  DISP @ DISP " THIS PROGRAM CALCULATES
    THE ","LOADING SEQUENCE."
27  DISP @ DISP "PLEASE WAIT A MOMENT."
30  !
40  COM A$[87],B$[26],C$[22],D$[35],E$[22],E1$[7],F$[6],
    F1$[6],F2$[6],F3$[8],F4$[4],F5$[9]
50  COM C1$[14],C2$[11],C3$[10],C4$[7]
60  COM F6$[15],F7$[8],F8$[7],F9$[7]
70  COM G$[10],G1$[9],G2$[6],G3$[9],G4$[10],G5$[10],
    G6$[10],G7$[14]
80  COM H$[10],I$[9],J$[10],K$[10],L$[10],M$[13],
    N$[16]
90  COM O$[10],P$[11],R$[13],S$[4],T$[12],U$[5],
    U1$[6],U2$[5],U3$[5],U4$[7],V$[7]
100 COM V1$[7],V2$[13],W$[13]
110 COM SHORT A(14,7)
120 COM INTEGER B(29,3)
130 ! ** %MAC IN H-ARM
140 DEF FNX1(D) = 28.34799+.0660806*D
150 ! ** H-ARM IN %MAC
160 DEF FNX2(D) = (D-28.34799)/.0660806
170 !
180 SHORT C(17,11)
190 FOR I=1 TO 17
200 FOR J=1 TO 11
210 READ C(I,J)
220 NEXT J
230 NEXT I
240 DATA 16.263,2795,0,0,0
250 DATA 16.168,1285,0,0,0,2900
260 DATA 18.727,2795,0,0,0
270 DATA 17.758,1285,0,0,0,5450
280 DATA 21.191,2795,0,0,0
290 DATA 19.318,1285,0,0,0,8000
300 DATA 0,0,0,0,0
310 DATA 20.888,1285,0,0,0,8000
320 DATA 23.655,2795,0,0,0
330 DATA 22.458,1285,0,0,0,10550
340 DATA 0,0,0,0,0
350 DATA 24.018,1285,0,0,0,10550
360 DATA 26.119,6033,0,0,0
370 DATA 0,0,0,0,0,13100
380 DATA 28.582,6033,0,0,0
390 DATA 0,0,0,0,0,6033
400 DATA 31.046,6033,0,0,0
410 DATA 0,0,0,0,0,24000
```

PRINT OUT No. 4

```
420 DATA 33.51,6033,0,0,0
430 DATA 34.381,1285,0,0,0,21600
440 DATA 35.974,2795,0,0,0
450 DATA 35.971,1285,0,0,0,17800
460 DATA 38.234,2795,0,0,0
470 DATA 37.561,1285,0,0,0,13400
480 DATA 0,0,0,0,0
490 DATA 39.151,1285,0,0,0,13400
500 DATA 40.459,2795,0,0,0
510 DATA 41.16,1640,0,0,0,8385
520 DATA 42.756,2795,0,0,0
530 DATA 42.7,860,0,0,0,4400
540 DATA 45.016,2400,0,0,0
550 DATA 0,0,0,0,0,2400
560 DATA 0,0,0,0,0
570 DATA 0,0,0,0,0,0
580 IF A(1,6)+A(6,6)<110000 THEN A(5,1)=31 ! MAX CG
    ZFW
590 IF A(7,6)<11000 THEN A(5,1)=A(5,1)-1 ! MAX CG
    ZFW
600 A(5,6)=A(1,6)+A(6,6) ! ZFW
610 A(4,6)=A(1,6)+A(6,6)+A(7,6) ! TXW
620 A(12,2)=A(5,6)*FNX1(A(5,1)) ! ZFW-MAX.MOMENT
630 A(6,5)=A(12,2)-A(1,7) ! MAX FREIGHT MOMENT
640 C(17,3)=A(6,5) ! RESTMOMENT
650 C(14,9)=B(24,2) ! BULK A
660 C(15,9)=B(25,2) ! BULK B
670 !----UPPER DECK ZONE G-P--2 110
680 X=13 @ X1=0
690 FOR I=16 TO 9 STEP -1
700 IF X=0 THEN GOTO 1740 ! ERROR 1
710 IF C(I,2)=0 THEN 790
720 IF B(X,3)>0 THEN X=X-1 @ GOTO 700
730 IF B(X,2)>C(I,2) THEN X=X-1 @ GOTO 700
740 IF B(X,2)+C(17,4)+C(I,9)>C(I,11) THEN X=X-1 @
    GOTO 700
750 C(I,4)=B(X,2)
```

PRINT OUT No. 4

```
760   C(I,5)=B(X,1)
770   B(X,3)=1
780   C(17,4)=C(17,4)+C(I,4)+C(I,9)
790   X=13 @ NEXT I
800   !
810   !-----ZONE F-----------
820   X=13
830   IF X=1 THEN 1760 ! ERROR 2
840   IF B(X,3)>0 THEN X=X-1 @ GOTO 830
850   C(8,4)=B(X,2)
860   C(8,5)=B(X,1)
870   B(X,3)=1
880   !
```

PRINT OUT NO. 5

```
890   !----UPPER DECK ZONE A-E---
900   FOR I=1 TO 7
910   X=1
920   IF X=13 THEN PRINT "UPPER DECK FWD" @
        GOTO 1780 ! ERROR 3
930   IF C(I,2)=0 THEN 1010
940   IF B(X,3)>0 THEN X=X+1 @ GOTO 920
950   IF B(X,2)>C(I,2) THEN X=X+1 @ GOTO 920
960   IF B(X,2)+C(17,1)>C(I,11)
        THEN X=X+1 @ GOTO 920
970   C(I,4)=(X,2)
980   C(I,5)=B(X,1)
990   C(17,1)=C(17,1)+C(I,4)
1000  B(X,3)=1
1010  NEXT I
1020  !
1030  !---LOWER DECK AFT------
1040  C(17,5)=C(16,4)+C(15,4)+
        C(15.9)+C(14,4)+C(14,9)
1050  C(17,4)=C(17,4)-C(17,5)
1060  X=23 @ X8=0
1070  FOR I=13 TO 10 STEP -1
1080  IF X<14 THEN 1210
1090  IF B(X,3)>0 THEN X=X-1 @ GOTO 1080
1100  IF X<14 THEN 1210
1110  IF B(X,2)>C(I,7) THEN X=X-1 @ GOTO 1080
1120  IF B(X,2)+C(17,5)+C(I,4)>C(I,11)
        THEN X=X-1 @ GOTO 1080
1130  IF I>10 THEN 1150
1140  IF B(X,2)+C(17,5)+C(10,4)+C(9,4)>C(9,11)
        THEN X=X-1 @ GOTO 1080
1150  IF B(X,2)+C(17,5)+C(17,4)>C(9,11)
        THEN X=X-1 @ GOTO 1080
1160  C(I,9)=B(X,2)
1170  C(I,10)=B(X,1)
1180  B(X,3)=1
1190  C(17,5)=C(17,5)+C(I,4)+C(I,9)
1200  C(17,4)=C(17,4)-C(I,4)
1210  X=23 @ NEXT I
1220  !-----LOWER FWD---------
1230  C(17,1)=0
1240  FOR I=1 TO 6
1250  C(17,1)=C(17,1)+C(I,4)
1260  X=14
1270  IF X=24 THEN 1820 ! ERROR 5
1280  IF B(X,3)>0 THEN X=X+1 @ GOTO 1270
1290  IF B(X,2)>C(I,7) THEN X=X+1 @ GOTO 1270
1300  IF B(X,2)+C(17,1)>C(I,11)
        THEN PRINT "LOWER FWD" @ GOTO 1840
        ! ERROR 6
```

PRINT OUT NO. 6

```
1310  C(17,1)=C(17,1)+B(X,2)
1320  C(I,9)=B(X,2)
1330  C(I,10)=B(X,1)
1340  B(X,3)=1
1350  NEXT I
1360  C(17,6)=0
1370  FOR I=1 TO 16
1380  C(I,3)=C(I,4)*C(I,1)
1390  C(I,8)=C(I,9)*C(I,6)
1400  C(17,6)=C(I,3)+C(I,8)+C(17,6)
1410  NEXT I
1415  A(6,7)=C(17,6)
1420  C(17,7)=C(17,6)-C(17,3)
1440  A(4,7)=A(8,3)+A(6,7)
1450  A(4,3)=A(4,7)/A(4,6)
1455  A(4,3)=FNX2(A(4,3))
1460  IF C(17,6)<=C(17,3) THEN BEEP @ GOTO 1720
1480  IF C(17,10)=1 THEN 2310
1490  I=16-C(17,11)
1500  IF I=1 THEN C(17,10)=1 @
        GOTO 2310 ! LOWER DECK
1510  J=I-1
1520  IF C(I,4)=0 THEN I=I-1 @ GOTO 1500
1530  IF J=0 THEN I=I-1 @ GOTO 1500
1540  IF C(J,2)=0 THEN J=J-1 @ GOTO 1530
1550  IF C(J,4)>C(I,2) THEN J=J-1 @ GOTO 1530
1560  IF C(I,4)>C(J,2) THEN J=J-1 @ GOTO 1530
1570  X8=C(I,3)+C(J,3)-(C(I,4)*C(J,1)+C(J,4)*C(I,1))
1580  IF X8<10 THEN 1610 ! DO NOT EXCHANGE
1590  IF C(17,3)-C(17,6)+X8>1000 THEN 1610
1600  GOTO 1640 ! EXCHANGE
1610  J=J-1
1620  IF J>0 THEN 1530
1630  C(17,11)=C(17,11)+1 @ GOTO 1490
1640  EXCHANGE
1650  I1=C(I,4) @ C(I,4)=C(J,4) @ C(J,4)=I1
1660  I1=C(I,5) @ C(I,5)=C(J,5) @ C(J,5)=I1
1670  GOTO 1360
1680  PRINT "FURTHER EXCHANGE NECESSARY" @
        PRINT @ BEEP
1690  GOTO 1720
1700  PRINT "SORTING COMPLETED!" @
        PRINT @ BEEP
1710  GOTO 1720
1720  GOSUB 2080 @ GOSUB 2500 @ CHAIN "OBCO40"
1730  IMAGE 4D, " :",4D,4X,4D," :",4D
```

```
1740  X1=X1+1 @ PRINT "UPPER DECK RUN ";X1
1750  GOSUB 1860 @ GOTO 690
1760  PRINT "ERROR 2"
1770  GOTO 1360
1780  PRINT "NEW LOADING ORDER NECESSARY",
        "BASED ON OTHER BENDING MOMENTS!"
1790  GOTO 1360
1800  GOSUB 1980
1810  GOTO 1080
1820  PRINT "ERROR 5"
1830  GOTO 1360
1840  PRINT "SORT ANEW",
        "BASED ON OTHER BENDING MOMENTS!"
1850  GOTO 1360
1860  ! UPPER DECK SORT ANEW
1870  IF X1=12 THEN DISP
        "UPPER DECK FREIGHT CANNOT BE LOADED"
        @ GOTO 1360
1880  FOR I-1 TO 25
1890  B(I,3)=0
1900  NEXT I
1910  FOR I=1 TO 16
1920  C(I,3),C(I,4),C(I,5)=0
1930  C(I,8),C(I,9),C(I,10)=0
1940  NEXT I
1950  C(17,1),C(17,2),C(17,4)=0
1960  C(17,5)=0
1970  RETURN
1980  X8=X8+1
1990  IF X8=10 THEN DISP
        "UPPER DECK MUST BE CHANGED!"
        @ GOTO 1360
2000  FOR I=14 TO 23
2010  B(I,3)=0
2020  NEXT I
2030  FOR I=10 TO 13
2040  C(I,9),C(I,10)=0
2050  NEXT I
```

-continued

| | |
|---|---|
| 2060 | X=X−X8 |
| 2070 | RETURN |
| 2080 | PRINT @ PRINT "CALCULATED LOADING SEQUENCE:" @ PRINT @ CLEAR |
| 2090 | IMAGE 3X,6A,6A,5X,6A,6A |
| 2100 | IMAGE 3D,X,4D,X,4D,"KG" |
| 2110 | IMAGE 17X,3D,X,4D,X,4D,"KG" |
| 2112 | IMAGE 18X,"BULK A:",1X,4D,"KG" |
| 2114 | IMAGE 18X,"BULK B:",1X,4D,"KG" |
| 2120 | PRINT USING 2090 ; F1$,F$,F2$,F$ |
| 2130 | PRINT @ PRINT "POS. NR. WGHT. POS. NR. WGHT." |
| 2140 | J=101 @ J1=11 |
| 2150 | FOR I=1 TO 16 |
| 2160 | IF C(I,2)=0 THEN 2190 |

PRINT OUT NO. 8

| | |
|---|---|
| 2170 | PRINT USING 2100 ; J,C(I,5),C(I,4) |
| 2180 | J=J+1 |
| 2190 | IF I=14 THEN PRINT USING 2112 ; C(14,9) @ GOTO 2240 |
| 2195 | IF I=15 THEN PRINT USING 2114 ; C(15,9) @ GOTO 2240 |
| 2200 | IF C(I,7)=0 THEN 2240 |
| 2210 | PRINT USING 2110 ; J1,C(I,10),C(I,9) |
| 2220 | J1=J1+1 @ IF J1=13 THEN J1=21 |
| 2230 | IF J1=25 THEN J1=41 |
| 2240 | PRINT |
| 2250 | NEXT I |
| 2260 | PRINT |
| 2300 | RETURN |
| 2310 | ! LOWER DECK |
| 2320 | I=13−C(17,9) |
| 2330 | IF I=1 THEN 1680 |
| 2340 | J=I−1 |
| 2350 | IF C(I,9)=0 THEN I=I−1 @ GOTO 2330 |
| 2360 | IF J=0 THEN I=I−1 @ GOTO 2330 |
| 2370 | IF C(J,7)=0 THEN J=J−1 @ GOTO 2360 |
| 2380 | IF C(J,9)>C(I,7) THEN J=J−1 @ GOTO 2360 |
| 2390 | IF C(I,9)>C(J,7) THEN J=J−1 @ GOTO 2360 |
| 2400 | IF C(I,8)+C(J,8)>C(I,9)*C(J,6)+C(J,9)*C(I,6) THEN 2460 |
| 2410 | J=J−1 |
| 2420 | IF J>0 THEN 2360 |
| 2430 | C(17,9)=C(17,9)+1 @ GOTO 2320 |
| 2440 | ! EXCHANGE |
| 2450 | ! |
| 2460 | I1=C(I,9) @ C(I,9)=C(J,9) @ C(J,9)=I1 |
| 2470 | I1=C(I,10) @ C(I,10)=C(J,10) @ C(J,10)=I1 |
| 2480 | GOTO 1360 |
| 2490 | END |
| 2500 | A(2,6)=A(1,6)+A(6,6)+A(12,6) |
| 2510 | A(2,7)=A(1,7)+A(6,7)+A(12,7) |
| 2515 | A(2,3)=A(2,7)/A(2,6) |
| 2520 | A(2,3)=FNX2(A(2,3)) |
| 2530 | A(3,6)=A(1,6)+A(6,6)+A(11,6) |
| 2540 | A(3,7)=A(1,7)+A(6,7)+A(11,7) |
| 2545 | A(3,3)=A(3,7)/A(3,6) |
| 2550 | A(3,3)=FNX2(A(3,3)) |
| 2560 | A(5,7)=A(1,7)+A(6,7) |
| 2565 | A(5,3)=A(5,7)/A(5,6) |
| 2570 | A(5,3)=FNX2(A(5,3)) |

PRINT OUT NO. 9

| | |
|---|---|
| 2580 | IMAGE "ACTUAL ",4A,13X,6D,"KG" |
| 2590 | IMAGE "CG OF ",X,4A,13X,DD.D"%MAC" |
| 2600 | I=1 @ D1$="OWE " @ GOSUB 2700 |
| 2620 | I=5 @ D1$="ZFW " @ GOSUB 2700 |
| 2640 | I=4 @ D1$="TXW " @ GOSUB 2700 |
| 2660 | I=2 @ D1$="TOW " @ GOSUB 2700 |
| 2680 | I=3 @ D1$="LW " @ GOSUB 2700 |
| 2681 | DISP "FUELPRICE ($/LTR):"; |
| 2682 | INPUT R1 |

PRINT OUT NO. 9

| | |
|---|---|
| 2683 | DISP "DISTANCE (NM) "; |
| 2684 | INPUT R2 |
| 2685 | R3=R1/1.72*29.5*R2*(1−(A(5,3)−25)*(A(2,6)+(A(2,6)−A(9,6)+13.3812*R2))/110333320) |
| 2686 | IMAGE "TOTAL FUELPRICE : ",5X,6D.DD,"$" |
| 2687 | PRINT USING 2686 ; R3 |
| 2688 | PRINT @ PRINT "0.78 MACH ; 33000 FEET : ISA " |
| 2689 | PRINT "FUELPRICE :";R1;"$/LTR " |
| 2690 | PRINT "DISTANCE :";R2;"NM" |
| 2698 | PRINT @ PRINT @ PRINT @ RETURN |
| 2700 | J=I*5 @ PRINT USING 2580 ; D1$,A(I,6) |
| 2720 | PRINT USING 2590 ; D1$,A(I,3) |
| 2725 | PRINT @ RETURN |

PRINT OUT NO. 10

| | |
|---|---|
| 10 | CLEAR @ DISP TAB(10);"O B C O 40" @ DISP @ DISP |
| 11 | X$="DATE " |
| 12 | DISP X$;@ INPUT X1$ |
| 13 | Y$="FLIGHT NR " |
| 14 | DISP Y$;@ INPUT Y1$ |
| 15 | Z$="A/C REG. " |
| 16 | DISP Z$;@ INPUT Z1$ |
| 17 | DISP @ DISP |
| 20 | DISP "PROGRAM IS BEING INITIATED.","PLEASE WAIT." |
| 30 | WAIT 3000 |
| 40 | ! |
| 50 | ! TITLE : OBCO40 |
| 60 | ! |
| 70 | COM A$[87],B$[26],C$[22],D$[35],E$[22],E1$[7],F$[6],F1$[6],F2$[6],F3$[8],F4$[4],F5$[9] |
| 80 | COM C1$[14],C2$[11],C3$[10],C4$[7] |
| 90 | COM F6$[15],F7$[8],F8$[7],F9$[7] |
| 100 | COM G$[10],G1$[9],G2$[6],G3$[9],G4$[10],G5$[10],G6$[10],G7$[14] |
| 110 | COM H$[10],I$[9],J$[10],K$[10],L$[10],M$[13],N$[16] |
| 120 | COM O$[10],P$[11],R$[13],S$[4],T$[12],U$[5],U1$[6],U2$[5],U3$[5],U4$[7],V$[7] |
| 130 | COM V1$[7],V2$[13],W$[13] |
| 140 | COM SHORT A(14,7) |
| 150 | COM INTEGER B(29,3) |
| 160 | ! |
| 170 | ! END COMMERCIAL PART |
| 180 | ! |
| 190 | SHORT H(41) |
| 200 | A$="TO CHANGE ONE OF THIS VALUES, PRESS THE FUNCTIONKEY K1 TO K4 OR SHIFT K5 TO K8." |
| 210 | B$="PLEASE PUT IN A NEW VALUE." |
| 220 | C$="SORRY, THIS VALUE IS " |
| 230 | C1$="SORRY,NO MORE " |
| 240 | C2$="POSSIBLE " |
| 250 | C3$="INCLUDING " |
| 260 | C4$="WEIGHT " |
| 270 | D$="OWE :MTOW:MLW :MTXW:MZFW:" |
| 280 | E$="CENTER OF GRAVITY OF " |
| 290 | E1$=" % MAC " |
| 300 | F$="DECK " |
| 310 | F1$="UPPER " |
| 320 | F2$="LOWER " |
| 330 | F3$="FORWARD " |
| 340 | F4$="AFT " |
| 350 | F5$="BULKLOAD " |

PRINT OUT NO. 11

| | |
|---|---|
| 360 | F6$="LOADING SYSTEM " |
| 370 | F7$="PALLETS " |
| 380 | F8$="96*125 " |
| 390 | F9$="88*125 " |
| 400 | G$="REMAINING " |
| 410 | G1$="FREIGHT " |
| 420 | G2$="DATAS " |

PRINT OUT NO. 11

```
430   G3$="CAPACITY "
440   G4$="CONTAINER "
450   G5$="TYPE LD3 "
460   G6$="TYPE LD1 "
470   G7$="TYPE NAS 3610 "
480   I$="POSITION "
490   M$="TRAFFICLOAD "
500   N$="OUT OF LIMITS !"
510   O$="ALLOWABLE "
520   P$="RESTART BY "
530   R$="ENTERING THE "
540   S$="KEY "
550   T$="CONTINUE BY "
560   U$="FUEL "
570   U1$="TOTAL "
580   U2$="TRIP "
590   U3$="TAXI "
600   U4$="? KG "
610   V$="-RUN-"
620   V1$="-CONT-"
630   W$="INPUT OF THE "
640   V2$="COMPARTMENT "
680   FOR I=1 TO 14
690   FOR J=1 TO 7
700   READ A(I,J)
710   NEXT J
720   NEXT I
730   DATA 32,18,22.2,100000,84000,0,0
740   DATA 32,18,0,165000,100000,0,0
750   DATA 35,15,0,134000,84000,0,0
760   DATA 32,18,0,165900,100000,0,0
770   DATA 32,18,0,124000,84000,0,0
780   DATA 0,0,0,40000,0,0,0
790   DATA 0,0,0,48484,10000,0,0
800   DATA 0,0,0,48484,0,0,0
810   DATA 0,0,0,48000,5000,0,0
820   DATA 0,0,0,5000,500,0,0
830   DATA 0,0,0,43000,500,0,0
840   DATA 0,0,0,48000,5000,0,0
850   DATA 0,0,0,0,0,0,0
860   DATA 0,0,0,0,0,0,0
870   FOR I=1 TO 41
880   READ H(I)
890   NEXT I
900   DATA 33.02,33.138,33.31,33.53,33.68,28.705,28.71,28.715
910   DATA 28.72,28.73,28.74,28.76,28.78,28.81,28.84,28.885,28.94
```

PRINT OUT NO. 12

```
920   DATA 29,29.08,29.165,29.26,29.37,29.42,28.96,28.7,28.54
930   DATA 28.42,28.325,28.26,28.21,28.175,28.15,28.13,28.12
      28.105,28.1
940   DATA 28.092,28.09,28.07,28.045,28.008
950   FOR I=1 TO 29
960   FOR J=1 TO 3
970   B(I,J)=0
980   NEXT J
990   NEXT I
1000  B(26,1)=13
1010  B(26,2)=10
1020  B(26,3)=2500
1030  B(27,1)=12 @ B(27,2)=4 @ B(27,3)=1
1040  FOR I=2 TO 5 ! FOR ANZ. LOOP
1050  A(I,6)=A(I,4)
1060  NEXT I
1070  A(1,6)=A(1,5)
1080  CLEAR
1090  ON KEY# 1, "OWE " GOTO 1340
1100  ON KEY# 2, "MTOW" GOTO 1350
1110  ON KEY# 3, "MLW " GOTO 1360
1120  ON KEY# 4, "CONTINUE" GOTO 1600
1130  ON KEY# 5, "%MAC" GOTO 1390
1140  ON KEY# 6, "MTXW" GOTO 1370
1150  ON KEY# 7, "MZFW" GOTO 1380
1160  ON KEY# 8, GOTO 1600
1170  KEY LABEL
1180  J=5 @ K=1
1190  FOR I=1 TO 5
1200  DISP D$[J-4,J];
1210  IMAGE 10X,6D,X,"KG",4X,"K",D
1220  DISP USING 1210 ; A(I,6);K
1230  K=K+1
1240  IF K=4 THEN K=6
1250  J=J+5
1260  NEXT I
1270  DISP
1280  DISP E$;D$[1,4]
1290  DISP TAB(12);A(1,3);E1$;TAB(29);"K5"
1300  DISP
1310  DISP A$
1320  GOTO 1320
1330  END
1340  I=1 @ GOTO 1480
1350  I=2 @ GOTO 1480
1360  I=3 @ GOTO 1480
1370  I=4 @ GOTO 1480
1380  I=5 @ GOTO 1480
1390  CLEAR
1400  DISP E$;D$[1,5]
1410  DISP A(1,3);E1$
1420  DISP B$
```

PRINT OUT NO. 13

```
1430  INPUT B
1440  IF B<A(1,2) THEN DISP C$;N$ @ GOTO 1400
1450  IF B>A(1,1) THEN DISP C$;N$ @ GOTO 1400
1460  A(1,3)=B
1470  GOTO 1080
1480  CLEAR @ J=I*5
1490  DISP D$[J-4,J];TAB(15);A(I,6);"KG"
1500  DISP B$
1510  INPUT B
1520  IF B<A(I,5) THEN 1560
1530  IF B>A(I,4) THEN 1560
1540  A(I,6)=B
1550  GOTO 1080
1560  DISP C$;N$ @ GOTO 1500
1570  !
1580  ! INPUT FUEL DATA
1590  !
1600  CLEAR
1603  FOR I=2 TO 5 ! INSERT MAX WGHT
1605  A(I,4)=A(I,6)
1607  NEXT I
1610  DISP W$;U$;G2$
1620  DISP
1630  DISP U1$;U$;U4$ @ I=7 ! TOTAL
1640  GOSUB 1700
1650  DISP U2$;U$;U4$ @ I=9 ! TRIP
1660  GOSUB 1700
1670  DISP U3$;U$;U4$ @ I=10 ! TAXI
1680  GOSUB 1700
1690  GOTO 1810
1700  INPUT B
1710  IF B<A(I,5) THEN 1760
1720  IF B>A(I,4) THEN 1760
1730  IF I=9 THEN GOTO 1790
1740  A(I,6)=B
1750  RETURN
1760  DISP C$,N$ ! OUTSIDE OF TOLERANCE
1770  DISP B$ ! NEW INPUT
1780  GOTO 1700
1790  IF B>A(7.6) THEN GOTO 1760
1800  GOTO 1740
1810  T=A(7,6) ! TOTAL FUEL
1820  GOSUB 2210
1830  A(7,7)=M1
1840  T=A(8,6) ! REMAINING FUEL
1850  GOSUB 2210
1860  A(8,7)=M1
1870  A(12,6)=A(7,6)-A(10,6)
1880  T=A(12,6) ! TO-FUEL
1890  GOSUB 2210
1900  A(12,7)=M1
```

| PRINT OUT NO. 13 |
| --- |
| 1910    A(11,6)=A(12,6)−A(9,6) |

| PRINT OUT NO. 14 | |
| --- | --- |
| 1920 | T=A(11,6) ! LANDING FUEL |
| 1930 | GOSUB 2210 |
| 1940 | A(11,7)=M1 |
| 1950 | T=7000 ! OUTBOARD TANKS |
| 1960 | GOSUB 2210 |
| 1970 | A(7,2)=M1 |
| 1975 | ! |
| 1977 | ! |
| 1980 | ! ASCERTAIN ALLOW TRAFFICLOAD |
| 1990 | A=A(5,4)+A(7,6) ! MZFW+TOT.FUEL |
| 2000 | B=A(2,4)+A(10,6) ! MTOW +TAXIF |
| 2010 | C=A(3,4)+A(9,6)+A(10,6) ! MLW+TRIPF+TAXIF. |
| 2020 | D=MIN(A,B) |
| 2030 | D=MIN(D,C) |
| 2040 | A(4,4)=MIN(D,A(4,4)) |
| 2050 | A(8,2)=A(1,6)+A(7,6) ! OPER.WGHT |
| 2060 | A(6,4)=MIN(A(4,4)−A(8,2),A(6,4)) ! MAX TRAFFICLOAD |
| 2070 | CLEAR @ GOTO 2520 |
| 2080 | IMAGE 5D,X,"KG" |
| 2090 | DISP U1$;U$;TAB(18); |
| 2100 | DISP USING 2080 ; A(7,6) |
| 2110 | DISP U2$;U$;TAB(18); |
| 2120 | DISP USING 2080 ; A(9,6) |
| 2130 | DISP U3$;U$;TAB(18); |
| 2140 | DISP USING 2080 ; A(10,6) |
| 2150 | DISP @ DISP |
| 2160 | DISP T$;R$,S$;V1$ |
| 2170 | DISP |
| 2180 | DISP P$;R$,S$;V$ |
| 2190 | RETURN |
| 2200 | ! |
| 2210 | ! ***FUEL-BILL********* |
| 2220 | W1=.782 @ T=T/W1 |
| 2230 | V1=2*4630 @ V2=2*17570 @ V3=17600 |
| 2240 | V4=V1+V2+V3 |
| 2250 | IF T<V1+V2 THEN 2340 |
| 2260 | T1=V1 @ T2=V2 @ T3=T−T1−T2 |
| 2270 | H1=H(5) @ H2=H(23) |
| 2280 | A1=INT(T3/1000) @ T4=FP(T3/1000) |
| 2290 | IF A1=0 THEN H3=H(24)+(H(24)−H(25))*(1−T4) @ GOTO 2490 |
| 2300 | A1=A1+23 |
| 2310 | IF A1=40 THEN H3=H(40)−(H(40)−H(41))/.6*T4 @ GOTO 2490 |
| 2320 | H3=H(A1)−(H(A1)−H(A1+1))*T4 |
| 2330 | GOTO 2490 |
| 2340 | IF T<V1 THEN 2430 |
| 2350 | H1=H(5) @ H3=H(24) |
| 2360 | T1=V1 @ T3=0 @ T2=T−T1 |
| 2370 | A1=INT(T2/2000) @ T4=FP(T2/2000) |

| PRINT OUT NO. 15 | |
| --- | --- |
| 2380 | IF A1=0 THEN H2=H(6)−(H(7)−H(6))*(1−T4) @ GOTO 2490 |
| 2390 | A1=A1+5 |
| 2400 | IF A1=22 THEN H2=H(22)+(H(23)−H(22))/.57*T4 @ GOTO 2490 |
| 2410 | H2=H(A1)+(H(A1+)1−H(A1))*T4 |
| 2420 | GOTO 2490 |
| 2430 | T1=T @ T2=0 @ T3=0 |
| 2440 | H2=H(6) @ H3=H(24) |
| 2450 | A1=INT(T1/2000) @ T4=FP(T1/2000) |
| 2460 | IF A1=0 THEN H1=H(1)−(H(2)−H(1))*(1−T4) @ GOTO 2490 |
| 2470 | IF A1=4 THEN H1=H(4)+(H(5)−H(4))/.65*T4 @ GOTO 2490 |
| 2480 | H1=H(A1)+(H(A1+1)−H(A1))*T4 |
| 2490 | M1=H1*T1*W1+H2*T2*W1+H3*T3*W1 |
| 2500 | RETURN |
| 2510 | ! **END FUEL BILL**** |

| PRINT OUT NO. 15 | |
| --- | --- |
| 2520 | ! % MAC IN H-ARM |
| 2530 | DEF FNX1 (D) = 28.34799+.0660806*D |
| 2540 | ! H-ARM IN % MAC |
| 2550 | DEF FNX2(D) = (D-28.34799)/.0660806 |
| 2560 | A(1,7)=A(1,6)*FNX1(A(1,3)) ! OWE MOMENT |
| 2570 | A(8,3)=A(1,7)+A(7,7) ! OW-MOMENT |
| 2610 | ! |
| 2620 | ! INPUT UPPERDECK |
| 2630 | ! |
| 2640 | FOR J=13 TO 1 STEP −1 |
| 2650 | CLEAR @ DISP W$;F1$;F$;G1$ |
| 2660 | DISP F9$;F7$ |
| 2670 | GOSUB 2920 |
| 2680 | DISP |
| 2690 | DISP J;F7$;F9$ |
| 2700 | DISP C3$ |
| 2710 | DISP J−B(27,3);F7$;F9$;">2400KG" |
| 2720 | DISP C3$ |
| 2730 | DISP MIN(J,B(27,2));F7$;F9$;">2795KG" |
| 2740 | GOSUB 3250 |
| 2742 | IF Z=9999 THEN 2950 ! LOWER DECK |
| 2750 | DISP C4$;C3$;F7$ |
| 2760 | INPUT Y |
| 2770 | IF Y>A(6,4)−A(6,6) THEN GOSUB 2910 @ GOTO 2740 |
| 2780 | IF Y>6033 THEN DISP C$;N$ @ GOTO 2740 |
| 2790 | IF Y>2795 THEN 2880 |
| 2800 | IF Y<=2400 THEN B(27,3)=0 @ GOTO 2820 |
| 2810 | IF B(27,1)=0 THEN 2890 |
| 2820 | B(J,1)=Z |

| PRINT OUT NO. 16 | |
| --- | --- |
| 2830 | B(J,2)=Y |
| 2840 | B(27,1)=B(27,1)−1 |
| 2850 | A(6,6)=A(6,6)+Y |
| 2860 | NEXT J |
| 2870 | GOTO 2970 |
| 2880 | IF B(27,2)=0 THEN DISP "NO MORE HEAVY PALLETS POSSIBLE" @ GOTO 2670 |
| 2890 | B(27,2)=B(27,2)−1 |
| 2900 | B(27,1)=B(27,1)+1 @ GOTO 2820 |
| 2910 | DISP C$;N$ |
| 2920 | DISP G$;G1$;G3$,A(6,4)−A(6,6);"KG" |
| 2930 | RETURN |
| 2940 | ! |
| 2950 | ! INPUT LOWER DECK |
| 2960 | ! |
| 2970 | FOR J=23 TO 14 STEP −1 |
| 2980 | CLEAR |
| 2990 | DISP W$;F2$;F$;G1$ |
| 3000 | DISP |
| 3010 | GOSUB 2920 |
| 3020 | DISP J−13;G4$;G6$ |
| 3030 | GOSUB 3250 |
| 3032 | IF Z=9999 THEN 3130 |
| 3040 | DISP C4$;C3$;G4$ |
| 3050 | INPUT Y |
| 3060 | IF Y>A(6,4)−A(6,6) THEN GOSUB 2910 @ GOTO 3010 |
| 3070 | IF Y>1285 THEN DISP C$;N$ @ GOTO 3040 |
| 3080 | B(J,2)=Y |
| 3090 | B(J,1)=Z |
| 3100 | A(6,6)=A(6,6)+Y |
| 3110 | NEXT J |
| 3120 | ! |
| 3130 | CLEAR @ ! BULKLOAD |
| 3140 | ! |
| 3150 | DISP G$;F5$;G3$ |
| 3160 | DISP MIN(2500,A(6,4)−A(6,6));"KG" |
| 3170 | DISP @ DISP F5$;C4$ |
| 3180 | INPUT Y |
| 3190 | IF Y>2500 THEN DISP C$;N$ @ GOTO 3150 |
| 3200 | IF Y<=860 THEN B(25,2)=Y @ GOTO 3230 |
| 3210 | B(25,2)=860 |
| 3220 | B(24,2)=Y−860 |
| 3230 | A(6,6)=A(6,6)+Y |

PRINT OUT NO. 16

| | |
|---|---|
| 3240 | GOTO 3330 |
| 3250 | DISP @ DISP |
| | "INPUT OF THE FREIGHT NUMBER"; |
| 3260 | INPUT Z |
| 3270 | FOR I=1 TO 23 |
| 3280 | IF Z=B(I,1)THEN DISP |
| | "FREIGHT NUMBER ALREADY EXIST!!!" @ GOTO 3250 |
| 3290 | NEXT I |

PRINT OUT NO. 17

| | |
|---|---|
| 3300 | RETURN |
| 3310 | IF A(6,4)−A(6,6)<=0 |
| | THEN DISP C1$;G1$;C2$,T$;R$,S$;V1$ |
| 3320 | RETURN |
| 3330 | IMAGE 4D,XXX,4D,"KG" |
| 3340 | FOR I=1 TO 12 |
| 3350 | FOR J=12 TO 1 STEP−1 |
| 3360 | IF B(J,2)>B(J+1,2) THEN GOSUB 3670 |
| 3370 | NEXT J |
| 3380 | NEXT I |
| 3390 | FOR I=1 TO 10 |
| 3400 | FOR J=22 TO 14 STEP −1 |
| 3410 | IF B(J,2)>B(J+1,2) THEN GOSUB 3670 |
| 3420 | NEXT J |
| 3430 | NEXT I |
| 3440 | CLEAR |
| 3450 | GOSUB 3500 |
| 3470 | ! |
| 3480 | CLEAR @ CHAIN "OBCO50" |
| 3490 | ! |
| 3500 | PRINT X$;TAB(20);X1$ |
| 3501 | PRINT Y$;TAB(20);Y1$ |
| 3502 | PRINT Z$;TAB(20);Y1$ |
| 3503 | IMAGE "FOR",3A,14X,6D,"KG" |
| 3504 | PRINT @ PRINT "LIMITATIONS:" |
| 3505 | PRINT |
| 3506 | I=5 @ GOSUB 5000 |
| 3507 | I=4 @ GOSUB 5000 |
| 3508 | I=2 @ GOSUB 5000 |
| 3509 | I=3 @ GOSUB 5000 |
| 3510 | PRINT |
| 3511 | IMAGE 6A,5A,11X,5D,"KG" |
| 3512 | IMAGE 5A,X,5A,11X,5D,"KG" |
| 3513 | PRINT USING 3511; U1$,U$,A(7,6) |
| 3514 | PRINT USING 3512; U2$,U$,A(9,6) |
| 3515 | PRINT USING 3512; U3$,U$,A(10,6) |
| 3516 | IMAGE 10A,12A,5D,"KG" |
| 3517 | IMAGE "ACTUAL",3X,12A,5D,"KG" |
| 3518 | PRINT |
| 3519 | PRINT USING 3516; O$,M$,A(6,4) |
| 3520 | PRINT USING 3517; M$A(6,6) |
| 3528 | PRINT @ PRINT "FREIGHT LIST:" |
| 3529 | PRINT "UPPER DECK" |
| 3530 | PRINT "NR WEIGHT" |
| 3540 | FOR I=1 TO 23 |
| 3550 | IF I=14 THEN PRINT "LOWER DECK" |
| 3560 | PRINT USING 3330; B(I,1),B(I,2) |
| 3570 | NEXT I |

PRINT OUT NO. 18

| | |
|---|---|
| 3580 | PRINT "BULKLOAD:" |
| 3590 | IMAGE "COMPARTMENT", "A :",4D,"KG" |
| 3600 | IMAGE "COMPARTMENT", "B :",4D,"KG" |
| 3610 | PRINT USING 3590 ; B(24,2) |
| 3620 | PRINT USING 3600 ; B(25,2) |
| 3630 | PRINT @ PRINT @ PRINT @ PRINT |
| 3640 | PRINT @ PRINT |
| 3650 | RETURN |
| 3660 | ! |
| 3670 | Z=B(J,1) |
| 3680 | B(J,1)=B(J+1,1) |
| 3690 | B(J+1,1)=Z |
| 3700 | Z=B(J,2) |

PRINT OUT NO. 18

| | |
|---|---|
| 3710 | B(J,2)=B(J+1,2) |
| 3720 | B(J+1,2)=Z |
| 3730 | RETURN |
| 5000 | J=I*5 |
| 5010 | PRINT USING 3503 ; D$[J−3,J],A(I,6) |
| 5020 | PRINT @ RETURN |

Print out Nr. 1 shows, for example, the input data for the computer or microprocessor 63 in FIG. 1, for calculating that center of gravity which is optimal for the most efficient fuel consumption (minimum fuel consumption).

Print out Nr. 2 shows, for example, the output data from computer 63 in FIG. 1. The labels for the brackets (1) to (9) in print outs Nr. 1 and Nr. 2 are self-explanatory.

The calculation of the optimal passenger weight distribution may be performed in an analogous manner whereby the passenger seats would be distributed on the upper deck.

Print outs 3 to 18 show a complete computer program written in "Basic" language for the microprocessor 63. Print outs 3 to 9 relate specifically to the program portion for determining the optimal loading sequence. Print outs 10 to 18 relate specifically to the weight and center of gravity calculations. As mentioned above, a Model HP 85 computer made by Hewlet Packard, Inc. may, for example, be used for implementing the microprocessor or computer 63 of FIG. 1. Generally, any computer comprising a central processing unit, a monitoring and display screen, any coded keyboard, a print out unit, and a cassette station for recording and reading data on or from magnetic tape cassettes can be used.

The flow diagram of FIG. 9 taken in combination with the above print outs 1 to 18 is self-explanatory. "A/C" stands for "aircraft". "C.G." stands for "center of gravity". Each block represents a numbered step. Step 1 involves the entry of the input data of print out 1 by means of the keyboard 64 in FIG. 3. Steps 2 to 13 are performed by the microprocessor 63 shown in block form in FIG. 4. Steps 14 and 15 are performed in the form of displays on the face of the display unit 65 shown in FIG. 3. Steps 16 and 17 are performed by the printer 70 shown in FIG. 6.

Although the invention has been described with reference to specific example embodiments it is to be understood that it is intended to cover all modifications and equivalents within the scope of the appended claims.

What is claimed is:

1. An apparatus for loading and unloading an aircraft and for ascertaining the weight of the load, comprising weighing station means arranged within the aircraft fuselage in such position that the weight of any item of payload to be added to the actual weight of the aicraft must operatively and individually pass said weighing station means for individually measuring the weight of each payload item entering the aircraft, load cell means in said weighing station means to provide weight data in the form of individual weight representing electrical signals, electronic logic circuit means, airborne digital computer means, conductor means operatively connecting said electronic logic circuit means to said load cell means and to said digital computer means for processing said individual weight representing electrical signals into respective control signals, said system further comprising ground based electronic data preparing means for preparing loading information data and transmission link means including ground based and airborne data link means operatively connected to said airborne digital computer means for also processing said loading information data received from said ground based data preparing means.

2. The apparatus of claim 1, wherein said ground based data preparing means comprise encoding means and digital computer means operatively connected to said digital encoding means.

3. The apparatus of claim 2, further comprising ground based scale means, said digital computer means forming a component of said ground based scale means.

4. The apparatus of claim 2 or 3, further comprising ground based input keyboard means and means operatively connecting said ground based input keyboard means to said ground based digital computer means.

5. The apparatus of claim 2, further comprising ground based recording means for producing a data carrier, said recording means being operatively connected to said encoding means.

6. The apparatus of claim 5, wherein said data carrier is a magnetic card.

7. The apparatus of claim 2, wherein said ground based data link means comprise a transmitter, and wherein said encoding means are operatively connected to said transmitter.

8. The apparatus of claim 1, wherein said ground based transmission link means comprise receiver means, said data preparing means further comprising decoder means and display means operatively arranged for providing an air to ground transmission path.

9. The apparatus of claim 1, wherein said airborne transmission link means and said ground based transmission link means each comprise transmitter receiver means.

* * * * *

UNITED STATES PATENT AND TRADEMARK OFFICE
CERTIFICATE OF CORRECTION

PATENT NO. : 4,446,524

DATED : May 1, 1984

INVENTOR(S) : Hans-Joachim Wendt

It is certified that error appears in the above-identified patent and that said Letters Patent is hereby corrected as shown below:

On the title page
In [30] Foreign Application Priority Data, the priority date of German Patent Application 2,926,870 should be: --July 3, 1979--.

Signed and Sealed this

Twenty-eighth Day of August 1984

[SEAL]

Attest:

GERALD J. MOSSINGHOFF

Attesting Officer

Commissioner of Patents and Trademarks